US012469624B2

(12) United States Patent
Nakajima

(10) Patent No.: US 12,469,624 B2
(45) Date of Patent: Nov. 11, 2025

(54) MAGNETIC BASE BODY AND METHOD OF MANUFACTURING MAGNETIC BASE BODY

(71) Applicant: TAIYO YUDEN CO., LTD., Tokyo (JP)

(72) Inventor: Takashi Nakajima, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 316 days.

(21) Appl. No.: 17/702,425

(22) Filed: Mar. 23, 2022

(65) Prior Publication Data

US 2022/0319747 A1 Oct. 6, 2022

(30) Foreign Application Priority Data

Mar. 31, 2021 (JP) ................................ 2021-061563

(51) Int. Cl.
*H01F 1/147* (2006.01)
*H01F 41/02* (2006.01)

(52) U.S. Cl.
CPC ............ *H01F 1/147* (2013.01); *H01F 41/02* (2013.01)

(58) Field of Classification Search
CPC ...... H01F 1/147; H01F 41/02; H01F 27/2823; H01F 2017/048; H01F 17/04; H01F 41/0246; H01F 1/33; H01F 1/24; H01F 27/255; H01F 27/306; H05K 1/18
See application file for complete search history.

(56) References Cited

U.S. PATENT DOCUMENTS

2015/0015359 A1* 1/2015 Kim .......................... B22F 3/14 252/62.55
2017/0287605 A1 10/2017 Tanada
2017/0320138 A1* 11/2017 Takahashi ................. H01F 1/22
2020/0051720 A1* 2/2020 Li ............................ H01F 3/08
2020/0316683 A1* 10/2020 Takahashi ........... H01F 41/0246

FOREIGN PATENT DOCUMENTS

JP 2017-183631 A 10/2017
WO WO-2018180659 A1 * 10/2018 .............. B22F 1/107

* cited by examiner

*Primary Examiner* — Brian Handville
(74) *Attorney, Agent, or Firm* — Pillsbury Winthrop Shaw Pittman, LLP

(57) ABSTRACT

A magnetic base body includes plural metal magnetic particles including a first metal magnetic particle and a second metal magnetic particle adjacent to the first metal magnetic particle, each metal magnetic particle including Fe, and plural metal Fe particles including metal Fe. The plural metal Fe particles are disposed separately from each other between an insulating first oxide layer and an insulating second oxide layer. The first oxide layer includes oxide of an element A disposed on a surface of the first metal magnetic particle. The second oxide layer includes oxide of an element B disposed on a surface of the second metal magnetic particle. The element A is at least one element selected from a group consisting of Si, Zr, Al, and Ti, and the element B is at least one element selected from the group consisting of Si, Zr, Al, and Ti.

22 Claims, 10 Drawing Sheets

MAGNETIC BASE BODY AND METHOD OF MANUFACTURING MAGNETIC BASE BODY

CROSS-REFERENCE TO RELATED APPLICATIONS

This application is based on and claims the benefit of priority from Japanese Patent Application Serial No. 2021-61563 (filed on Mar. 31, 2021), the contents of which are hereby incorporated by reference in its entirety.

TECHNICAL FIELD

The prevent disclosure mainly relates to a magnetic base body and a method of manufacturing the magnetic base body.

BACKGROUND

Various magnetic materials have been used as a material for a magnetic base body used in electronic components. Ferrite is often used as the magnetic material for coil components such as inductors. Ferrite is suitable as the magnetic material for an inductor because of its high magnetic permeability.

In recent years, devices and circuits used in various types of electronic devices such as electronic components have been developed to accept a larger amount of current. This causes a soft magnetic material, which allows a large current, to be often used as the material for a magnetic base body of an inductor. For example, Japanese Patent Application Publication 2017-183631 discloses an inductor having a magnetic base body including metal magnetic particles consisting of a soft magnetic material.

In a process for manufacturing a magnetic base body, a mixed material including metal magnetic particles and a binder resin is subjected to a heat treatment. During the heat treatment, a surface of the metal magnetic particle is formed with an oxide film which is a constituent element of the metal magnetic particle. For example, a surface of the metal magnetic particle including Fe and Cr is formed with a Cr oxide film consisting of Cr oxide and an Fe oxide film consisting of Fe oxide.

Depending on manufacturing conditions, the Fe oxide film may include magnetite which has a poor insulation property but exhibits a soft magnetism property, as well as hematite which has a good insulation property but exhibits no soft magnetism property. Accordingly, the Fe oxide film formed on the surface of the metal magnetic particle is composed to consist mainly of hematite to prevent resistance and dielectric strength voltage of the magnetic base body from deteriorating. However, with the Fe oxide film consisting mainly of hematite being formed on the surface of metal magnetic particle, the magnetic permeability of the magnetic base body can be reduced.

SUMMARY

An object of the present invention is to overcome or reduce at least a part of the above drawback. One more specific object of the present invention is to improve the magnetic permeability of the magnetic base body including metal magnetic particles consisting of Fe-based soft magnetic metal material.

Other objects of the present invention herein will be apparent with reference to the entire description in this specification. The present invention herein may solve any other drawbacks grasped from the following description, instead of or in addition to the above drawback.

The magnetic base body according to one aspect of the present invention comprises: plural metal magnetic particles including a first metal magnetic particle and a second metal magnetic particle adjacent to the first metal magnetic particle, each of the plural metal magnetic particles including Fe; and plural metal Fe particles disposed separately from each other between a first oxide layer and a second oxide layer, the first oxide layer having an insulation property and including oxide of an element A disposed on a surface of the first metal magnetic particle, the second oxide layer having an insulation property and including oxide of an element B disposed on a surface of the second metal magnetic particle, the element A being at least one element selected from a group consisting of Si, Zr, Al, and Ti, and the element B being at least one element selected from the group consisting of Si, Zr, Al, and Ti. In one embodiment, each of the plural metal Fe particles includes metal Fe.

According to one aspect of the present invention, the plural metal Fe particles have an average particle size from 2 to 30 nm.

According to one aspect of the present invention, each of the plural metal Fe particles is in direct contact with at least one of the first oxide layer and the second oxide layer.

According to one aspect of the present invention, each of the plural metal Fe particles is isolated from an adjacent one of the plural metal Fe particles by an insulating intervening portion.

According to one aspect of the present invention, each of the plural metal Fe particles further includes Cr. The magnetic base body according to one aspect of the present invention further includes plural metal Cr particles including metal Cr, the plural metal Cr particles disposed between the first oxide layer and the second oxide later and separated from each other.

According to one aspect of the present disclosure, each of the plural metal Cr metal particles is disposed separately from each of the plural metal Fe particles.

One aspect of the present invention relates to a coil component. The coil component according to one aspect of the present invention includes the above magnetic base body and a coil conductor provided in or on the magnetic base body.

One aspect of the present invention relates to a circuit board comprising the above coil component.

One aspect of the present invention relates to an electronic device comprising the above circuit board.

One aspect of the present invention relates to a manufacturing method of a magnetic base body. The manufacturing method of a magnetic base body includes: a step of preparing a molded body including plural metal magnetic particles, the plural metal magnetic particles including Fe and an element A, the element A being at least one element selected from a group consisting of Si, Zr, Al, and Ti; a first heating step of heating the molded body to form a first oxide film on a surface of each of the plural metal magnetic particles and a second oxide film on a surface of the first oxide film, the first oxide film including oxide of the element A, the second oxide film including Fe oxide; and a second heating step of, after the first heating step, heating the molded body under a reducing atmosphere to produce plural metal Fe particles from the second oxide film.

According to one aspect of the present invention, the plural metal Fe particles are produced to be separated from each other in the second heating step.

According to one aspect of the present invention, the first heating step includes forming a third oxide film consisting mainly of Cr oxide on a surface of the first oxide film. According to one aspect of the present invention, the second oxide film is formed on the third oxide film. According to one aspect of the present invention, the second heating step includes producing plural metal Cr particles from the third oxide film.

According to one aspect of the present invention, the first heating step is performed under an oxygen atmosphere with an oxygen concentration of 800 ppm or greater at a first temperature from 300 to 400 degrees Celsius.

According to one aspect of the present invention, the second heating step is performed at a second temperature from 400 to 800 degrees Celsius.

According to one aspect of the present invention, the reducing atmosphere under which the second heat treatment is performed has a hydrogen concentration from 0.5% to 4.0%.

According to one or more embodiments of the present invention, it is possible to improve the magnetic permeability of a magnetic base body including metal magnetic particles consisting of Fe-based soft magnetic metal material.

DESCRIPTION OF THE EMBODIMENTS

Various embodiments of the present invention will be hereinafter described with reference to the accompanying drawings. Elements common to a plurality of drawings are denoted by the same reference signs throughout the plurality of drawings. For convenience of explanation, the drawings are not necessarily drawn to scale. The following embodiments of the present invention do not limit the scope of the claims. The elements described in the following embodiments are not necessarily essential to solve the problem to be solved by the invention.

Figure 1:
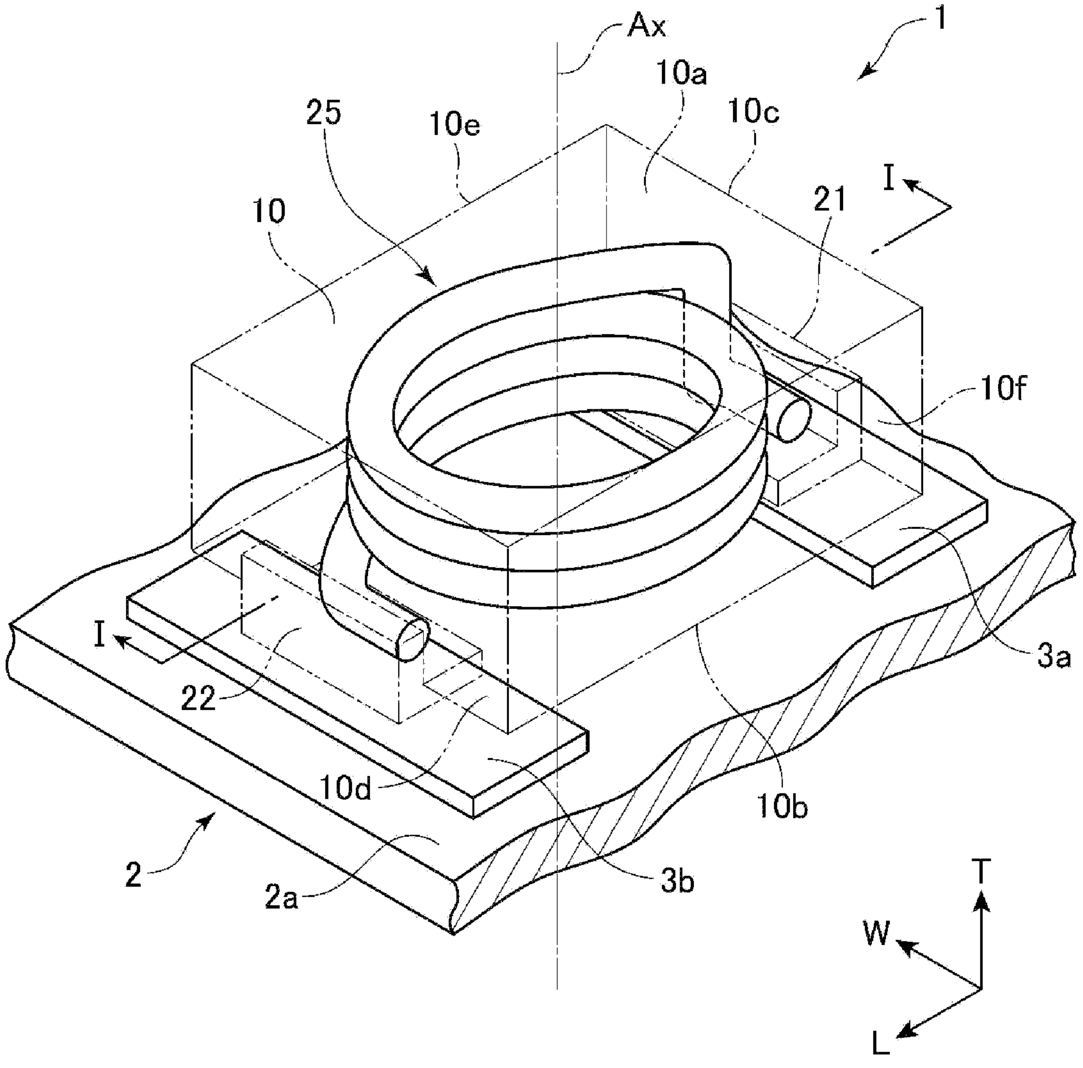
FIG. 1 is a perspective view schematically showing a coil component according to one embodiment of the invention.
Figure 2:
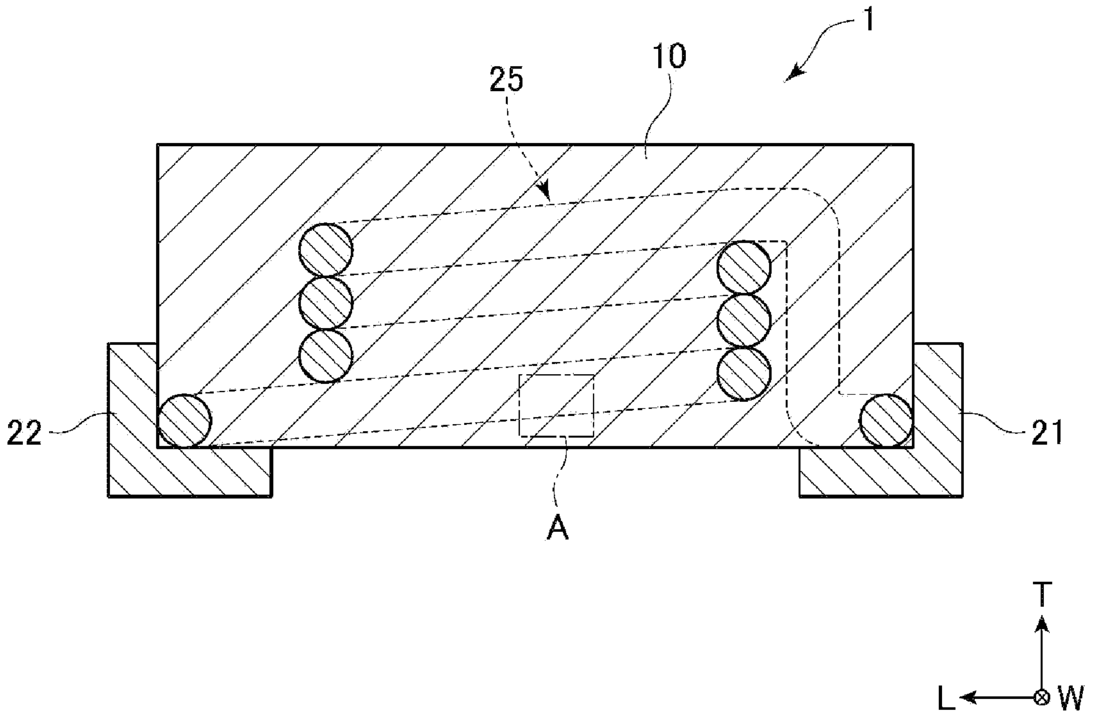
FIG. 2 is a sectional view schematically showing a sectional surface of the coil component of FIG. 1 cut along the line I-I.

An electronic component 1 including a magnetic base body 10 according to one embodiment of the present invention will be described with reference to FIGS. 1 to 2. FIG. 1 is a perspective view schematically showing the coil component 1 including the magnetic base body 10, and FIG. 2 is a schematic sectional view showing a sectional surface of the coil component 1 cut along the line I-I in FIG. 1. As shown, the coil component 1 includes a magnetic base body 10, a coil conductor 25 disposed in the magnetic base body 10, an external electrode 21 disposed on a surface of the magnetic base body 10, and an external electrode 22 disposed on the surface of the magnetic base body 10 at a position spaced apart from the external electrode 21. In FIG. 1, the magnetic base body 10 appears transparent, such that the coil conductor 25 provided in the magnetic base body 10 is shown.

The arrangement, dimensions, shapes, and other aspects of the members may be herein described based on the L axis, the W axis, and the T axis shown in FIGS. 1 and 2. The "length" direction, the "width" direction, and the "thickness" direction of the coil component 1 may be herein referred to as the L axis direction, the W axis direction, and the T axis direction in FIG. 1, respectively. The "thickness" direction may be also referred to as the "height" direction.

The coil component 1 may be mounted on a mounting substrate 2*a*. The mounting substrate 2*a* has land portions 3*a*, 3*b* provided thereon. The coil component 1 is mounted on the mounting substrate 2*a* by connecting the external electrode 21 to the land portion 3*a* and connecting the external electrode 22 to the land portion 3*b*. A circuit board 2 according to one embodiment of the present invention includes the coil component 1 and the mounting substrate 2*a* having the coil component 1 mounted thereon. The circuit board 2 can be installed in various electronic devices. The electronic devices in which the circuit board 2 can be installed include smartphones, tablets, game consoles, electrical components of automobiles, a server, and various other electronic devices.

The coil component 1 may be an inductor, a transformer, a filter, a reactor and any one of various other coil components. The coil component 1 may alternatively be a coupled inductor, a choke coil, and any one of various other magnetically coupled coil components. The coil component 1 may be, for example, a power inductor used in a DC/DC converter. Applications of the coil component 1 are not limited to those explicitly described herein.

In the illustrated embodiment, the base body 10 is made of magnetic material and formed in a substantially rectangular parallelepiped shape. In one embodiment of the present invention, the magnetic base body 10 has a length (the dimension in the L axis direction) of 1.0 to 6.0 mm, a width (the dimension in the W axis direction) of 1.0 to 6.0 mm, and a height (the dimension in the T axis direction) of 1.0 to 5.0 mm. The dimensions of the magnetic base body 10 are not limited to those specified herein. The term "rectangular parallelepiped" or "rectangular parallelepiped shape" used herein is not intended to mean solely "rectangular parallelepiped" in a mathematically strict sense. The dimensions and the shape of the magnetic base body 10 are not limited to those specified herein.

The magnetic base body 10 has a first principal surface 10*a*, a second principal surface 10*b*, a first end surface 10*c*, a second end surface 10*d*, a first side surface 10*e*, and a second side surface 10*f*. The outer surface of the magnetic base body 10 is defined by these six surfaces. The first principal surface 10_a_ and the second principal surface 10_b_ are at the opposite ends in the height direction, the first end surface 10_c_ and the second end surface 10_d_ are at the opposite ends in the length direction, and the first side surface 10_e_ and the second side surface 10_f_ are at the opposite ends in the width direction.

As shown in FIG. 1, the first principal surface 10_a_ lies on the top side of the magnetic base body 10, and therefore, the first principal surface 10_a_ may be herein referred to as “the top surface.” Likewise, the second principal surface 10_b_ may be referred to as “the bottom surface.” The coil component 1 is disposed such that the second principal surface 10_b_ faces the mounting substrate 2_a_, and therefore, the second principal surface 10_b_ may be herein referred to as “the mounting surface.” The top-bottom direction of the coil component 1 mentioned herein refers to the top-bottom direction in FIG. 1.

In one embodiment of the present invention, the external electrode 21 extends on the mounting surface 10_b_ and the end surface 10_c_ of the magnetic base body 10. The external electrode 22 extends on the mounting surface 10_b_ and the end surface 10_d_ of the magnetic base body 10. The shapes and positions of the external electrodes 21, 22 are not limited to those in the example shown. The external electrodes 21 and 22 are separated from each other in the length direction.

The coil conductor 25 is wound spirally around a coil axis Ax extending in the thickness direction (the T-axis direction). The coil conductor 25 is connected at one end thereof to the external electrode 21 and connected at the other end thereof to the external electrode 22. In the illustrated embodiment, only the opposite ends of the coil conductor 25 are exposed on the magnetic base body 10 and the remaining portion is positioned within the magnetic base body 10. In this way, at least a part of the coil conductor 25 is covered by the magnetic base body 10. In the illustrated embodiment, the coil axis Ax intersects the first and second principal surfaces 10_a_ and 10_b_ but does not intersect the first and second end surfaces 10_c_ and 10_d_ and the first and second side surfaces 10_e_ and 10_f_. In other words, the first and second end surfaces 10_c_ and 10_d_ and the first and second side surfaces 10_e_ and 10_f_ extend along the coil axis Ax. FIG. 2 shows a sectional surface of the magnetic base body 10 cut along a plane extending through the coil axis Ax.

In one embodiment of the present invention, the magnetic base body 10 may include metal magnetic particles composed of soft magnetic metal material. The magnetic base body 10 may include a single type of metal magnetic particles or multiple types of metal magnetic particles having different average particle sizes and/or differing in composition.

Figure 3:
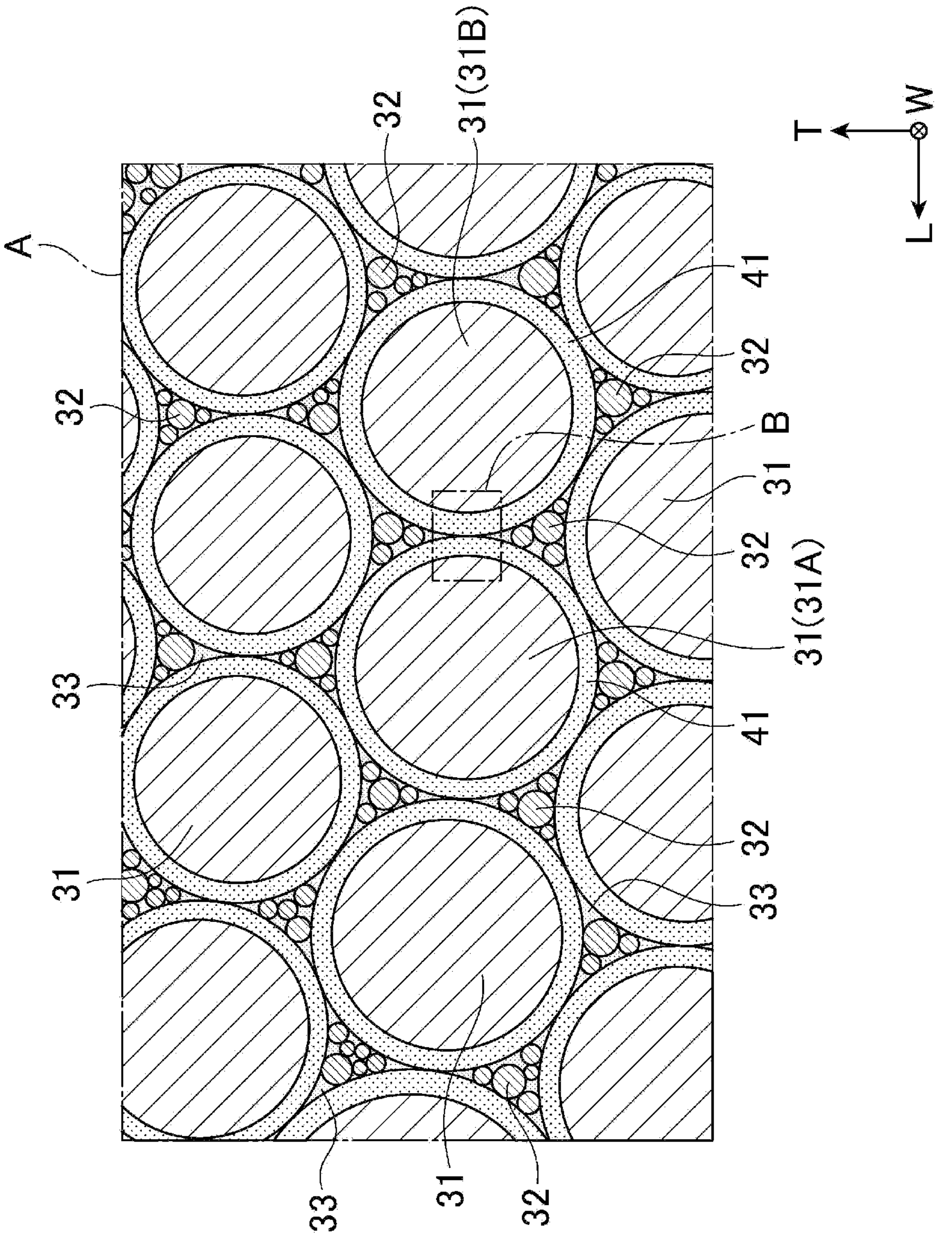
FIG. 3 is an enlarged schematic view of a region A shown in FIG. 2.
Figure 4:
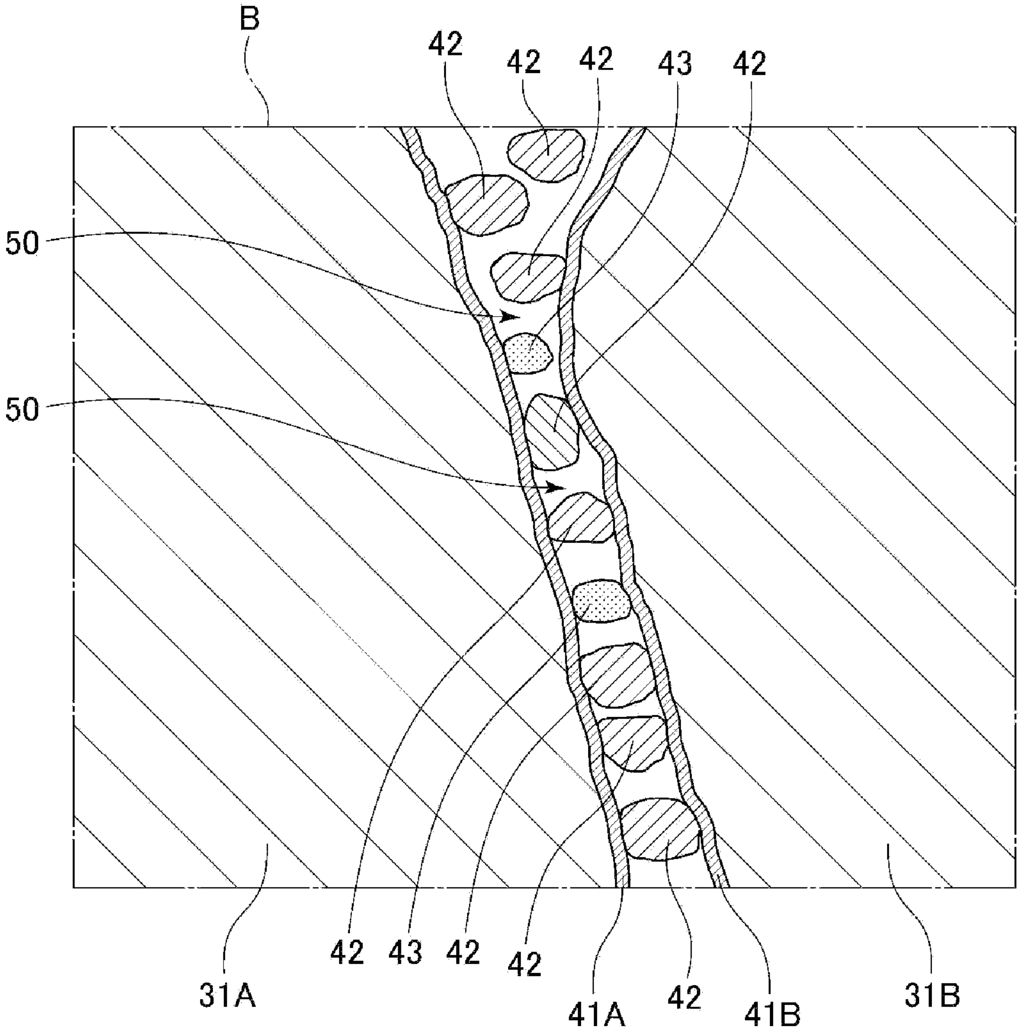
FIG. 4 is an enlarged schematic view of a region B shown in FIG. 3.

The microstructure of the magnetic base body 10 will now be described with reference to FIGS. 3 and 4. FIG. 3 is an enlarged schematic view of the region A in the sectional surface of the magnetic base body 10 shown in FIG. 2, and FIG. 4 is an enlarged schematic view of the region B in the sectional surface of the magnetic base body 10 shown in FIG. 3. FIG. 3 shows an embodiment of the magnetic base body 10 including plural types of metal magnetic particles. The magnetic base body 10 shown in FIG. 3 includes plural metal magnetic particles 31 and plural metal magnetic particles 32. The composition of the metal magnetic particles 31 may be the same as or different from the composition of the metal magnetic particles 32. As shown, the plural metal magnetic particles 32 may have a smaller average particle size than the plural metal magnetic particles 31. For example, the average particle size of the metal magnetic particles 32 may be ½ or less, ⅓ or less, ¼ or less, ⅕ or less, ⅙ or less, 1/7 or less, ⅛ or less, 1/9 or less, or 1/10 or less of the average particle size of the metal magnetic particles 31. The average particle sizes of the metal magnetic particles 31 and the metal magnetic particles 32 are determined in the following manner. The magnetic base body 10 is cut along the thickness direction (the T axis direction) to expose a sectional surface. The sectional surface is photographed using a scanning electron microscope (SEM) to obtain a SEM image, and the particle size distribution is determined based on the SEM image. The particle size distribution obtained in this way is used to determine the average particle sizes. For example, the 50th percentile (D50) of the particle size distribution obtained based on the SEM image can be used as the average particle size of the metal magnetic particles. The average particle size of the metal magnetic particles 31 may be, for example, 1 μm to 50 μm, and the average particle size of the metal magnetic particles 32 may be, for example, 0.1 μm to 20 μm. When the metal magnetic particles 32 have a smaller average particle size than the metal magnetic particles 31, the metal magnetic particles 32 can easily intervene between adjacent two of the metal magnetic particles 31. Consequently, the magnetic base body 10 can achieve a higher filling factor (or density) of the metal magnetic particles. When it is not necessary to distinguish between the metal magnetic particles 31 and the metal magnetic particles 32, the metal magnetic particles 31 and the metal magnetic particles 32 may be herein collectively referred to simply as “the metal magnetic particles.” The magnetic base body 10 may only include a single type of metal magnetic particles. For example, the magnetic base body 10 may only include the metal magnetic particles 31 without the metal magnetic particles 32.

Each of the metal magnetic particles included in the magnetic base body 10 consists of soft magnetic material. In one embodiment, each of the metal magnetic particles included in the magnetic base body 10 consists of soft magnetic material mainly consisting of Fe. Each of the metal magnetic particles included in the magnetic base body 10 includes Fe. Each of the metal magnetic particles included in the magnetic base body 10 includes, in addition to Fe, an element which is at least one selected from the group consisting of Si, Zr, Al, and Ti. The element included in the metal magnetic particle 32 may be the same as or different from the element included in the metal magnetic particle 31. Each of the metal magnetic particles included in the magnetic base body 10 may further include Cr, in addition to Fe and at least one element selected from the group consisting of Si, Zr, Al, and Ti. Each of the metal magnetic particles included in the magnetic base body 10 may include an element other than the above elements (i.e., Fe, at least one element selected from the group consisting of Si, Zr, Al, and Ti, and Cr), such as at least one of boron (B), carbon (C), and nickel (Ni). Each of the metal magnetic particles included in the magnetic base body 10 may be (1) a crystalline alloy particle such as an Fe—Si—Cr alloy, an Fe—Si—Al alloy, an Fe—Si—Al—Cr alloy, or an Fe—Si alloy, (2) an amorphous alloy particle such as an Fe—Si—B alloy, an Fe—Si—Cr—B—C alloy, or an Fe—Si—Cr—B alloy, or (3) a mixed particle obtained by mixing these materials. The composition of the metal magnetic particles contained in the magnetic base body 10 is not limited to those described above.

The metal magnetic particle 31 and the metal magnetic particle 32 may have cross-section surfaces of various shapes. The cross-section shapes of the metal magnetic particles 31 and the metal magnetic particles 32 shown in FIG. 3 are substantially circular. However, when the metal magnetic particles 31 and the metal magnetic particles 32 are compressed with a high pressure in a manufacturing process of the magnetic base body 10, either or both of the metal magnetic particles 31 and the metal magnetic particles 32 can be plastically deformed to have non-circular cross-section shapes.

An insulating film is formed on the surface of the metal magnetic particles included in the magnetic base body 10. The metal magnetic particles may be joined to each other via the insulating film formed on the metal magnetic particles. The insulating film formed on a surface of the metal magnetic particle may be an oxide layer 41 consisting mainly of oxide of at least one element selected from the group consisting of Si, Zr, Al, and Ti included in the metal magnetic particle. For example, the oxide layer 41 consists mainly of Si oxide. It can be considered that the oxide layer 41 consists mainly of Si oxide in a case where the abundance of Si elements, which is an abundance of Si elements expressed in at %, is the largest among the elements other than oxygen included in the oxide layer 41. Comparison between the abundances of elements means that the abundances of elements expressed in at % are compared. The oxide layer 41 has a high insulation property because it consists mainly of oxide of at least one element selected from the group consisting of Si, Zr, Al, and Ti. The oxide layer 41 is composed of, for example, silicon oxide. The oxide layer 41 may be an oxide layer formed by oxidizing Si elements included in the metal magnetic particle. The oxide layer 41 may be a coating film including oxide of at least one element selected from the group consisting of Si, Zr, Al, and Ti, the coating film being formed on a surface of each of the metal magnetic particles by a coating process using the sol-gel method. The coating film including silicon oxide is formed on the surface of the metal magnetic particle by the sol-gel method as follows. First, a process solution containing TEOS (tetraethoxysilane, Si (OC2H5)4), ethanol, and water is mixed into a mixed solution containing metal magnetic particles, ethanol, and aqueous ammonia to prepare a mixture. Then, the mixture is stirred and then filtered. This separates from the mixture the metal magnetic particles that have a silicon oxide film formed on their surface. The metal magnetic particles having the silicon oxide film formed thereon may be subjected to heat treatment. The oxide layer 41 may be a multi-layered film including an oxide layer formed by oxidizing Si elements included in the metal magnetic particles and a coating film including oxide of at least one element selected from the group consisting of Si, Zr, Al, and Ti.

Next, a microstructure between adjacent metal magnetic particles will be described with reference to FIG. 4. FIG. 4 is a schematic enlarged sectional view of the region B of FIG. 3. FIG. 4 shows a part of the border between a first metal magnetic particle 31A and a second metal magnetic particle 31B adjacent to the first metal magnetic particle 31A among the plural metal magnetic particles 31 shown in FIG. 3. The first metal magnetic particle 31A and the second metal magnetic particle 31B are selected from the metal magnetic particles only for the purpose of illustration as an example. The description on the microstructure between the first metal magnetic particle 31A and the second metal magnetic particle 31B described with reference to FIG. 4 can be applied to a microstructure between other pair of adjacent metal magnetic particles included in the magnetic base body 10, including a microstructure between adjacent metal magnetic particles 31 and a microstructure between a metal magnetic particle 31 and a metal magnetic particle 32. Similarly, for the purpose of illustration, the oxide layer 41 formed on a surface of the first metal magnetic particle 31A is referred to as a first oxide layer 41A, and the oxide layer 41 formed on a surface of the second metal magnetic particle 31B is referred to as a second oxide layer 41B in FIG. 4. As described above, the oxide layer 41 includes oxide of at least one element selected from the group consisting of Si, Zr, Al, and Ti. For the purpose of illustration, the oxide layer 41A includes oxide of an element A (the element A is at least one element selected from the group consisting of Si, Zr, Al, and Ti), and the oxide layer 41B includes oxide of an element B (the element B is at least one element selected from the group consisting of Si, Zr, Al, and Ti). The oxide of the element A included in the oxide layer 41A may be the same as or different from the oxide of the element B included in the oxide layer 41B. In one embodiment, both oxide layer 41A and the oxide layer 41B may include Si oxide. In another embodiment, the oxide layer 41A may include Al oxide, whereas the oxide layer 41B may include Zr oxide without Al oxide.

As shown in FIG. 4, the first metal magnetic particle 31A and the second metal magnetic particle 31B are disposed such that the first oxide layer 41A and the second oxide layer 41B oppose to each other. Plural metal Fe particles 42 are disposed between the first oxide layer 41A and the second oxide layer 41B. Each of the plural metal Fe particles 42 includes metal Fe of a single α phase exhibiting a soft magnetic property. A particle inevitably containing a small quantity of metal Fe of another phase such as a y phase instead of an α phase can be also considered as the metal Fe particle 42. In one embodiment, the occupancy of a phase of the metal Fe particles 42 is 95% or greater in volume. The plural metal Fe particles 42 are disposed separately from each other via an intervening portion 50. The intervening portion 50 may be formed by a gap, a resin, or any other insulating material. Plural intervening portions 50 may be provided such that some of the intervening portions are gaps and the remaining portions are formed by insulating material. The intervening portion 50 may include oxidized iron which was not reduced in a process of reducing the oxide layer in a second heat treatment. As shown in FIG. 4, the plural metal Fe particles 42 are disposed on a surface of the first oxide layer 41A and a surface of the second oxide layer 41B respectively. At least some of the plural metal Fe particles 42 are in direct contact with at least one of the first oxide layer 41A and the second oxide layer 41B. Some of the plural metal Fe particles 42 may not be in direct contact with the first oxide layer 41A and the second oxide layer 41B. The metal Fe particles 42 may be formed, for example, through a process such as heating Fe elements included in the metal magnetic particles to produce an oxidized iron film and reducing and decomposing the oxidized iron film. The presence of the metal Fe particles 42 on a surface of the oxide layer 41 on a surface of the metal magnetic particle 31 can be perceived by the following. First, the magnetic base body 10 is cut to expose its cross-section surface. A transmission electron microscope (TEM) equipped with an energy dispersive X-ray spectroscopy (EDS) detector is used to obtain a TEM image by photographing the exposed cross-section surface of the magnetic base body 10 by such magnification as to make an observed area of 250 nm square (for example, about 50000-fold magnification). Then, an EDS analysis is carried out on the TEM image to obtain a distribution image of Fe elements, elements A (e.g., Si), and elements B (e.g., Si). The observed area of TEM is determined so as to include insulating films (e.g., oxide layers 41) disposed on the surfaces of the metal magnetic particles. The observed area determined so as to include borders between adjacent particles facilitates the observation. The surface of the first metal magnetic particle 31A is provided with the first oxide layer 41A including oxide of the element A (e.g., silicon dioxide). The distribution image therefore shows a belt-like area including the elements A at a location corresponding to the first oxide layer 41A disposed on the surface of the first metal magnetic particle 31A. Similarly, the surface of the second metal magnetic particle 31B is provided with the second oxide layer 41B including oxide of the element B (e.g., silicon dioxide). The distribution image therefore shows a belt-like area including the elements B at a location corresponding to the second oxide layer 41B disposed on the surface of the second metal magnetic particle 31B. If there is an area of 2 nm to 30 nm where Fe elements agglutinate between the belt-like area including oxide of the elements A and the belt-like area including oxide of the elements B, it can be determined that metal Fe particles 42 are present in the area where the Fe elements agglutinate. By analyzing on the area where the Fe elements agglutinate using the electron back scattering diffraction (SEM-EBSD), it is possible to confirm that the agglutinating Fe elements are metal Fe of a single α phase.

At least one metal Cr particle 43 may be present between the first oxide layer 41A and the second oxide layer 41B. As will be described later, the metal Cr particle 43 can be formed by subjecting the oxide film including Cr oxide to a heat treatment to reduce the Cr oxide. Depending on conditions of the heat treatment, the metal Cr particle 43 may be formed, or Cr oxide may not be reduced. Therefore, the metal Cr particle 43 may be or may not be present on the surface of the first metal magnetic particle 31A and/or the surface of the second metal magnetic particle 31B.

In one embodiment, the metal Cr particle 43 includes metal Cr of a single α phase exhibiting a soft magnetic property. A particle inevitably containing a small quantity of metal Cr of another phase such as a y phase instead of an α phase can be also considered as the metal Cr particle 43. In one embodiment, the occupancy of α phase of the metal Cr particles 43 is 95% or greater in volume. In a case where plural metal Cr particles are present between the first oxide layer 41A and the second oxide layer 41B, the plural metal Cr particles 43 are disposed separately from each other. The metal Cr particles 43 may also be disposed separately from the metal Fe particles 42. The metal Cr particles 43 are present on the surface of the first oxide layer 41A and the surface of the second oxide layer 41B. At least some of the plural metal Cr particles 43 are in direct contact with either or both of the first oxide layer 41A and the second oxide layer 41B. Some of the plural metal Cr particles 43 may not be in direct contact with the first oxide layer 41A and the second oxide layer 41B. The metal Cr particles 43 may be formed, for example, through a process such as heating Cr included in the metal magnetic particles to produce a Cr oxide film and reducing the film.

In one embodiment, the plural metal Fe particles 42 have an average particle size from 2 to 30 μm. The plural metal Cr particles 43 may also have an average particle size from 2 to 30 μm. The average particle size of the Fe fine particles and the average particle size of the metal Cr particles may be measured by a method similar to that for the average particle size of the above-described metal magnetic particles.

Figure 5:
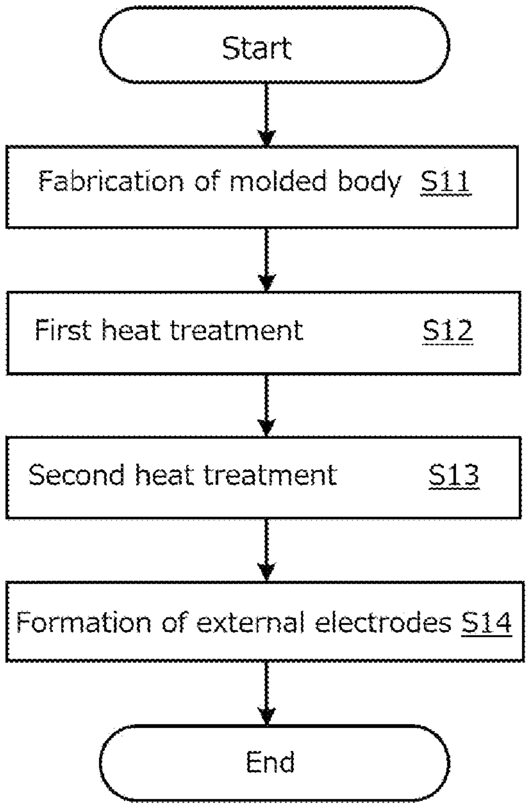
FIG. 5 is a flowchart showing a method of manufacturing a coil component according to one embodiment of the present invention.

An example method for manufacturing a coil component 1 including the magnetic base body 10 according to one embodiment of the present invention will now be described with reference to FIG. 5. FIG. 5 illustrates the example method for manufacturing the coil component 1 according to one embodiment of the present invention. In the manufacturing method illustrated in FIG. 5, the coil component 1 is manufactured by a compression molding process.

First, for preparation, a particle mixture of plural metal magnetic particles 31 and plural metal magnetic particles 32 is mixed and kneaded with a resin and a diluting solvent, thereby making a resin composition mixture. The resin may be an epoxy resin, a polyvinyl butyral (PVB) resin, or any other known resins.

Figure 6A:
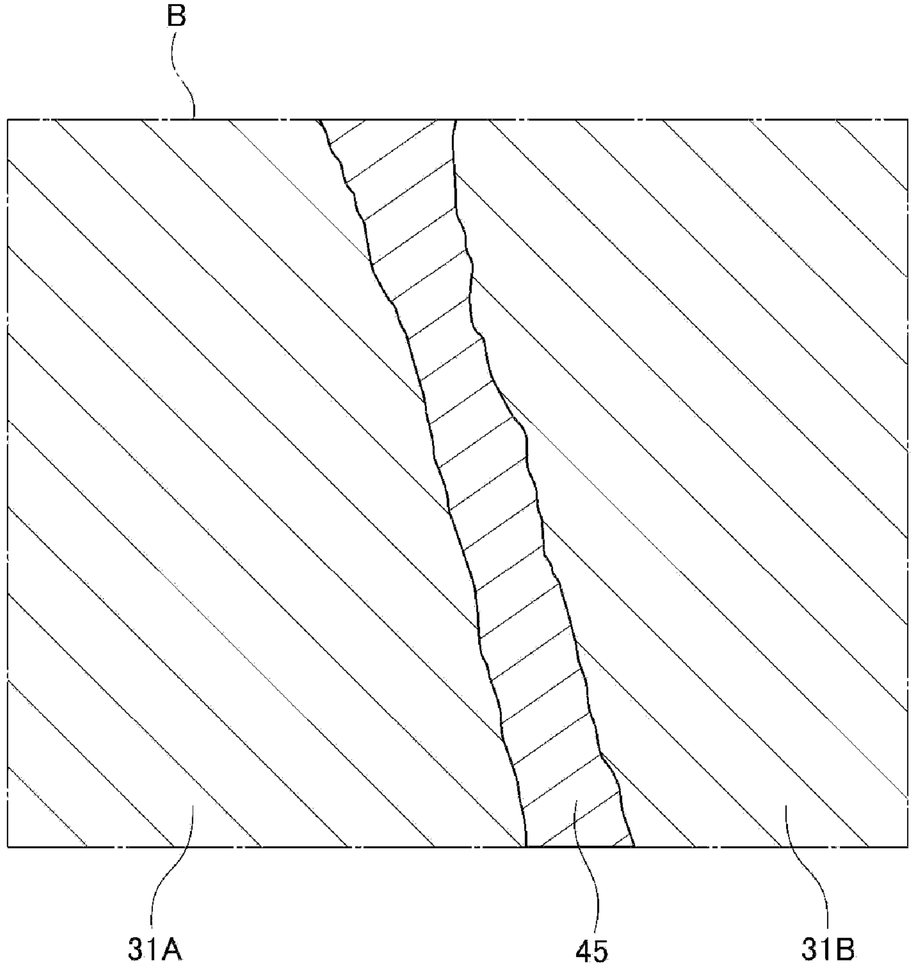
FIG. 6A is a schematic view schematically showing one example of a microstructure of a region between adjacent metal magnetic particles before a first heat treatment is performed.

Following this, in step S11, the coil conductor 25, which is prepared in advance, is placed in a cavity of a mold, the resin composition mixture made in the above manner is filled into the mold having the coil conductor 25 therein, and a molding pressure is then applied to the resin composition mixture in the mold. In this manner, a molded body enclosing therein the coil conductor 25 is fabricated. The molded body includes plural metal magnetic particles, where areas between the metal magnetic particles are filled with the resin included in the resin composition mixture. FIG. 6A shows an area between metal magnetic particles in a cross-section surface of the molded body fabricated in step S11. FIG. 6A shows an area corresponding to the region B of the magnetic base body 10 in the cross-section surface of the molded body fabricated in step S11. As shown, the area between the first metal magnetic particle 31A and the second metal magnetic particle 31B in the molded body is filled with resin 45. The resin 45 is the resin included in the resin composition mixture.

Figure 6B:
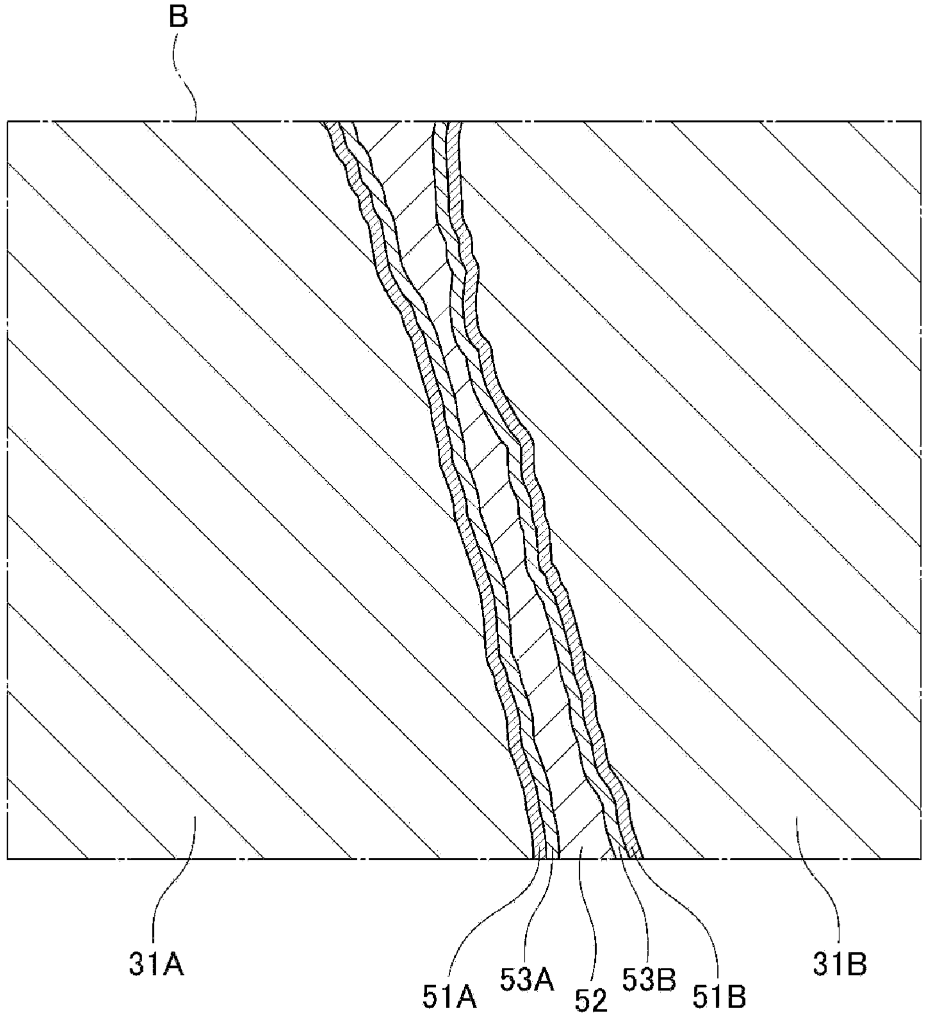
FIG. 6B is a schematic view schematically showing one example of a microstructure of the region between adjacent metal magnetic particles after the first heat treatment has been performed.
Figure 7:
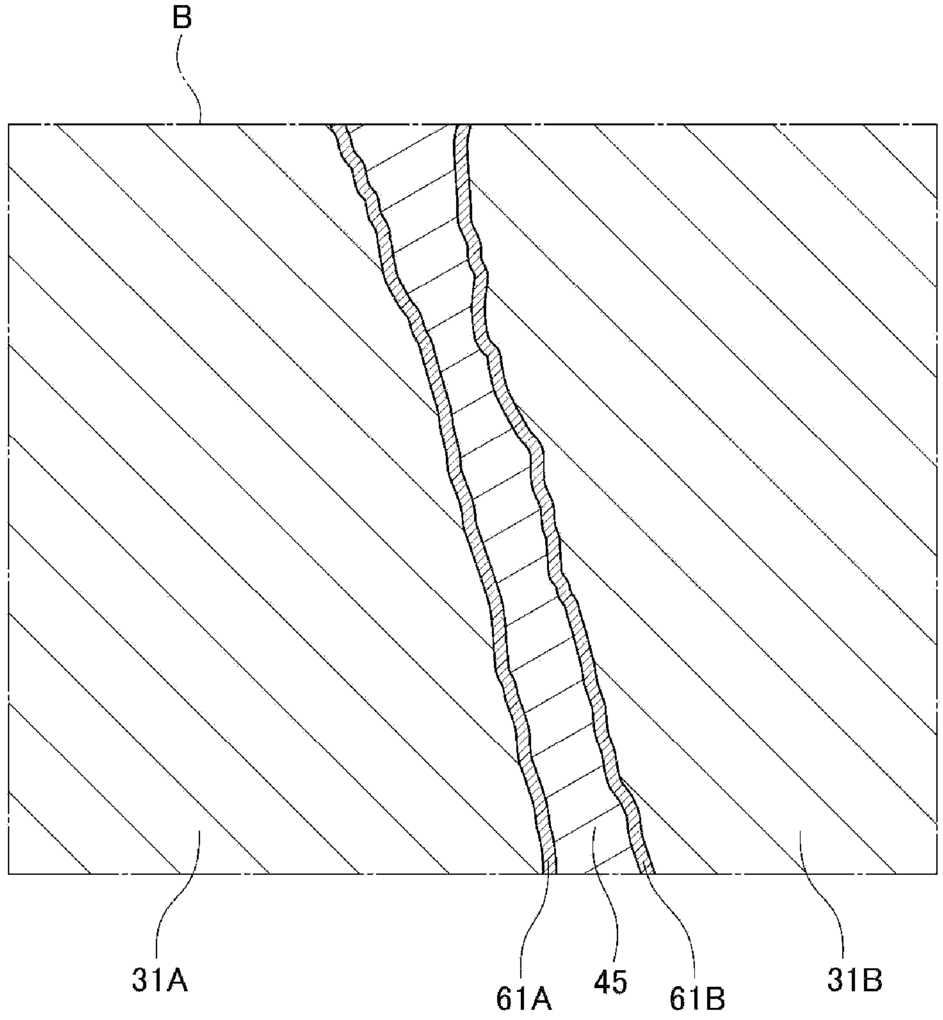
FIG. 7 is a schematic view schematically showing another example of a microstructure of a region between adjacent metal magnetic particles before the first heat treatment is performed.

Next, in step S12, the molded body fabricated in step S11 is subjected to a first heat treatment. The first heat treatment is performed under an oxygen atmosphere containing oxygen of 800 ppm or greater at a temperature from 300 to 400 degrees Celsius for a period of time from 30 minutes to 240 minutes. The first heat treatment may be performed in the air where the concentration of oxygen is about 21%. By the first heat treatment, the resin 45 is thermally decomposed and removed from the molded body. The surface of the metal magnetic particle is formed thereon with an insulating film. Specifically, the surface of the metal magnetic particle is formed thereon with an oxide film including oxide of a constituent element for the metal magnetic particle. More specifically, the surface of each of the metal magnetic particles is formed with an oxide film consisting mainly of oxide of at least one element selected from the group consisting of Si, Zr, Al, and Ti and with an oxide film consisting mainly of Fe oxide. It can be considered that the oxide film consists mainly of Fe oxide in a case where the abundance of Fe elements is the largest among the elements other than oxygen included in the oxide film. For example, as shown in FIG. 6B, an oxide film 51A, an oxide film 51B, an oxide film 52, an oxide film 53A, and an oxide film 53B are formed in the area between the first metal magnetic particle 31A and the second metal magnetic particle 31B by the first heat treatment. The oxide film 51A consists mainly of oxide of at least one element selected from the group consisting of Si, Zr, Al, and Ti, which is formed through oxidization of at least one element selected from the group consisting of Si, Zr, Al, and Ti included in the first metal magnetic particle 31A. The oxide film 51B consists mainly of oxide of at least one element selected from the group consisting of Si, Zr, Al, and Ti, which is formed through oxidization of at least one element selected from the group consisting of Si, Zr, Al, and Ti included in the second metal magnetic particle 31B. The oxide film 52 consists mainly of oxidized iron which is formed through oxidization of Fe included in the first metal magnetic particle 31A and the second metal magnetic particle 31B. The oxide film 53A consists mainly of Cr oxide which is formed through oxidization of Cr included in the first metal magnetic particle 31A. The oxide film 53B consists mainly of Cr oxide which is formed through oxidization of Cr included in the second metal magnetic particle 31B. In a case where the first metal magnetic particle 31A does not contain Cr, the oxide film 53A is not formed. In a case where the second metal magnetic particle 31B does not contain Cr, the oxide film 53B is not formed.

For fabrication of the molded body, the metal magnetic particles 31 and the metal magnetic particles 32 whose surfaces are formed with a coating film as an insulating film by a coating process can be used, where the coating film consists mainly of oxide of at least one element selected from the group consisting of Si, Zr, Al, and Ti. In this case, the molded body fabricated in step S11 has a first metal magnetic particle 31A whose surface is formed with a coating film 61A and a second metal magnetic particle 31B whose surface is formed with a coating film 61B. The coating film 61A consists mainly of oxide of at least one element selected from the group consisting of Si, Zr, Al, and Ti. The coating film 61B consists mainly of oxide of at least one element selected from the group consisting of Si, Zr, Al, and Ti. The area between the coating film 61A formed on the surface of the first metal magnetic particle 31A and the coating film 61B formed on the surface of the second metal magnetic particle 31B is filled with the resin 45. In this case, the first heat treatment in step S12 defats the coating films 61A and 61B to form the above-described oxide films 51A and 51B, and thermally decomposes the resin 45 to be removed. The first heat treatment further produces the oxide film 52 in the area between the coating film 61A and the coating film 61B. At least one of the coating film 61A and the coating film 61B may contain Cr in addition to consisting mainly of oxide of at least one element selected from the group consisting of Si, Zr, Al, and Ti. In a case where the coating film 61A contains Cr, the first heat treatment produces the oxide film 52 and the oxide film 53A in the area between the coating film 61A and the coating film 61B. In a case where the coating film 61B contains Cr, the first heat treatment produces the oxide film 52 and the oxide film 53B in the area between the coating film 61A and the coating film 61B. Similarly, when the molded body is fabricated using the metal magnetic particle 31 and the metal magnetic particle 32 whose surfaces are formed with a coating film consisting of oxide of the element A, a microstructure as shown in FIG. 6B is formed between the metal magnetic particles by the first heat treatment.

Next, in step S13, the molded body finished with the first heat treatment is subjected to a second heat treatment. The second heat treatment is performed, for example, under a reducing atmosphere with hydrogen concentration from 0.5% to 4.0% at a temperature between 400 and 800 degrees Celsius for a period of time from 30 minutes to 240 minutes. The second heat treatment produces the magnetic base body 10 from the molded body. In the second heat treatment, thermal diffusion occurs in the elements included in an insulating film on the surface of adjacent metal magnetic particles, which causes the adjacent metal magnetic particles to be joined to each other. The insulating film on the surface of each of the metal magnetic particles is also thermally processed. More specifically, the second heat treatment reduces at least some of the oxidized iron included in the oxide film 52 and decomposes the oxide film 52 into plural metal Fe particles 42 without maintaining a layer structure of the oxide film 52. In a case where the oxide films 53A and 53B are present, the second heat treatment reduces at least some of the Cr oxide included in the oxide films 53A and 53B and decomposes the oxide films 53A and 53B into plural metal Cr particles 43 without maintaining a layer structure of the oxide films 53*a* and 53B. As a result, in the magnetic base body 10 obtained by the second heat treatment, plural metal Fe particles 42 are present separately from each other on the surface of each of the metal magnetic particles as shown in FIG. 4. In a case where the metal magnetic particle is composed to contain Cr or where a coating layer containing Cr is present on the surface of the metal magnetic particle, plural metal Cr particles 43 are present separately from each other as shown in FIG. 4 in the magnetic base body 10 obtained by the second heat treatment. The plural metal Fe particles 42 and the plural metal Cr particles 43 may be disposed separately from each other in the area between adjacent metal magnetic particles. Cr is less easily reduced than Fe. Therefore, depending on conditions of the second heat treatment in step S13, only metal Fe particles 42 may be formed without metal Cr particles 43. The oxide films 51A and 51B consist of oxide of at least one element selected from the group consisting of Si, Zr, Al, and Ti, which is difficult to be reduced under a reducing atmosphere with hydrogen or the like. Therefore, the oxide films 51A and 51B are not decomposed into particles like the oxide film 52 and the oxide films 53A, 53B, but instead, keep a layer structure to form the oxide layers 41.

In this way, the magnetic base body 10 according to one embodiment of the present invention is produced through steps S11 to S13. Next, in step S14, a conductor paste is applied to the surface of the magnetic base body 10, which is obtained in step S13, to form an external electrode 21 and an external electrode 22. The external electrode 21 is electrically connected to one end of the coil conductor 25 placed within the magnetic base body 10, and the external electrode 22 is electrically connected to the other end of the coil conductor 25 placed within the magnetic base body 10. The external electrodes 21, 22 may include a plating layer. There may be two or more plating layers. The two plating layers may include an Ni plating layer and an Sn plating layer externally provided on the Ni plating layer. It is also possible that the external electrodes are formed as follows. The coil conductor 25 is placed such that the ends of the coil conductor 25 are exposed out of the magnetic base body 10, and the portions of the coil conductor 25 exposed out of the magnetic base body 10 are bent toward the mounting surface 10*b*, such that the portions of the coil conductor 25 exposed out of the magnetic base body 10 form the external electrodes.

As described above, the coil component is manufactured by the compression molding process. The manufactured coil component 1 may be mounted on the mounting substrate 2*a* using a reflow process. In this process, the mounting substrate 2*a* having the coil component 1 thereon passes at a high speed through a reflow furnace heated to, for example, a peak temperature of 260° C., and then the external electrodes 21, 22 are soldered to the corresponding land portions 3 of the mounting substrate 2*a*. In this way, the coil component 1 is mounted on the mounting substrate 2*a*, and thus the circuit board 2 is manufactured.

The method of manufacturing the coil component 1 described with reference to FIG. 5 can be modified in various manners. For example, a debinding process for removing resin included in the resin composition mixture may be performed separately from the first heat treatment in step 11. The debinding process performed separately from the first heat treatment may be performed by heating the molded body at or lower than a decomposition temperature for the resin. The debinding process may be performed at or lower than a temperature of the first heat treatment. The debinding process may be performed prior to the first heat treatment in step 11.

Figure 8:
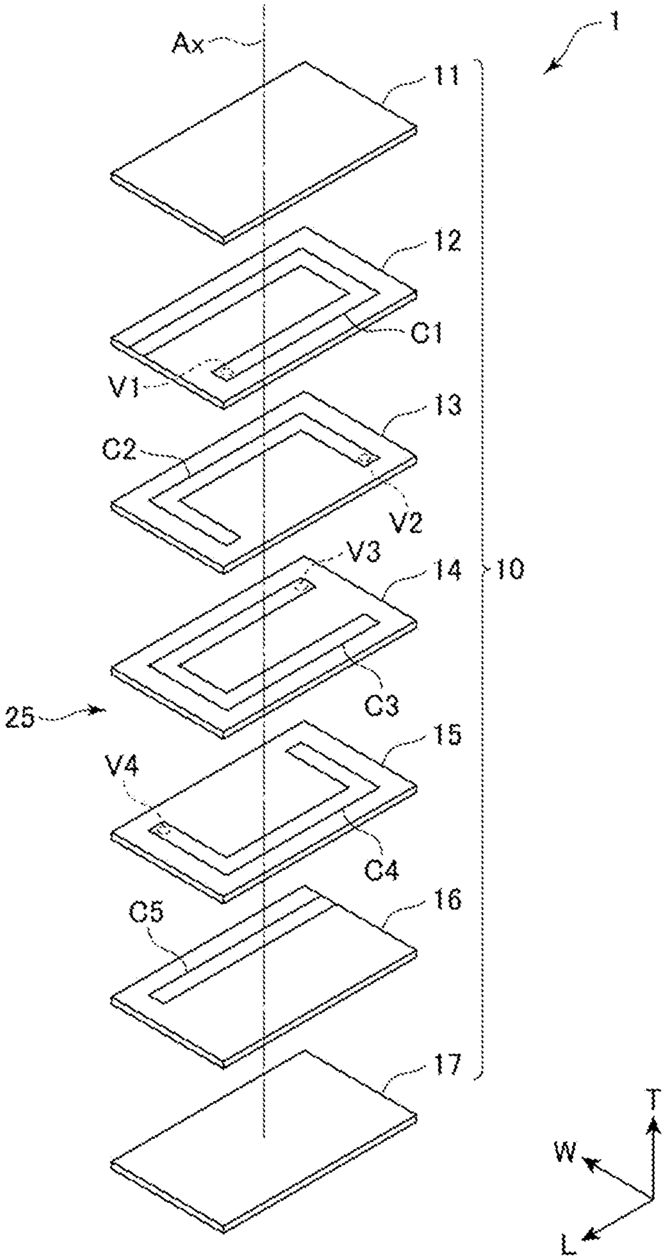
FIG. 8 is an exploded perspective view schematically showing a coil component according to another embodiment of the present invention.

The following describes a coil component 1 according to another embodiment of the present invention with reference to FIG. 8. FIG. 8 shows a perspective view of the coil component 1 according to the other embodiment of the present invention. The coil component 1 shown in FIG. 8 is a laminated coil.

The coil component 1 includes a magnetic base body 10. The magnetic base body 10 is produced by stacking plural magnetic sheets 11 to 17 together in the T-axis direction, bonding the stacked magnetic sheets by thermal compression, and subjecting the bonded sheets to the first heat treatment and the second heat treatment. As described above, the magnetic base body 10 includes plural metal magnetic particles. The surface of each of the metal magnetic particles included in the magnetic base body 10 is formed with an insulating oxide layer 41 consisting oxide of the element A. Plural metal Fe particles 42 are disposed between adjacent metal magnetic particles. In a case where the metal magnetic particle contains Cr or where a coating layer containing Cr is present on the surface of the metal magnetic particle, plural metal Cr particles 43 are disposed between adjacent metal magnetic particles.

The coil conductor 25 extends around the coil axis Ax extending in the T-axis direction. As shown, the coil conductor 25 includes conductor patterns C1 to C5 and via conductors V1 to V4 connecting between adjacent ones of the conductor patterns C1 to C5. The via conductors V1 to V4 may be fabricated by filling a conductive paste into through-holes formed in the magnetic sheets 12 to 15 and extending in the T-axis direction. The conductor patterns C1 to C5 are formed by, for example, printing on the magnetic sheets a conductive paste made of a highly conductive metal or alloy via screen printing, for example. The conductive paste may be made of Ag, Pd, Cu, Al, or alloys thereof. Each of the conductor patterns C1 to C5 is electrically connected to the respective adjacent conductor patterns through the via conductors V1 to V4. The conductor patterns C1 to C5 and the via conductors V1 to V4 connected together in this manner form the coil conductor 25 extending spirally around the coil axis Ax.

Next, a description is given of an example method of manufacturing the coil component 1 shown in FIG. 8. The coil component 1 shown in FIG. 8 can be manufactured by a lamination process. The first step is to prepare a plurality of magnetic sheets 11 to 17 made of a magnetic material. Each of the magnetic sheets 11 to 17 can be produced as follows. A resin composition mixture is formed by mixing and kneading a particle mixture, which contains the first metal magnetic particles 31 and the second metal magnetic particle 32, with a binder resin (for example, polyvinyl butyral (PVB) resin) and a diluting solvent (for example, toluene). The resin composition mixture thus formed is applied in the form of a sheet onto a base material such as a PET film by the doctor blade method for example. The applied resin composition mixture is dried to volatilize the diluting solvent.

Next, through-holes are formed at predetermined positions in the magnetic sheets 12 to 15 so as to extend through the magnetic sheets 12 to 15 in the T-axis direction. Following this, a conductive paste is printed by screen printing on the top surface of each of the magnetic sheets 12 to 16, so that an unfired conductor pattern is formed on each of the magnetic sheets 12 to 16. The through-holes formed in the magnetic sheets 12 to 15 are filled in with the conductive paste. The unfired conductor patterns formed on the magnetic sheets 12 to 16 are precursors of the conductor patterns C1 to C5, and the conductor paste filling the through-holes in the magnetic sheets 12 to 15 are precursors of the via conductors V1 to V4.

The magnetic sheets 11 to 17 are stacked together such that adjacent ones of the precursors of the conductor patterns C1 to C5 formed on these magnetic sheets are electrically connected to each other through the precursors of the via conductors V1 to V4. Following this, the magnetic sheets stacked together as described above are bonded together by thermal compression using a pressing machine to fabricate a sheet laminate.

Next, the sheet laminate bonded by thermal compression is diced to a desired size by using a cutter such as a dicing machine or a laser processing machine to make a chip laminate. Following this, the chip laminate is subjected to the first heat treatment in accordance with the conditions as described in relation to step S12, and then, the chip laminate finished with the first heat treatment is subjected to the second heat treatment in accordance with the conditions as described in relation to step S12. Accordingly, the magnetic base body 10 is obtained from the magnetic sheets included in the chip laminate.

Next, the end portions of the chip laminate finished with the second heat treatment are polished by barrel-polishing or the like as necessary. Following this, a conductive paste is applied to the both end portions of the chip laminate to form external electrodes. The coil component 1 is obtained by the lamination process in the above-described manner.

Figure 9:
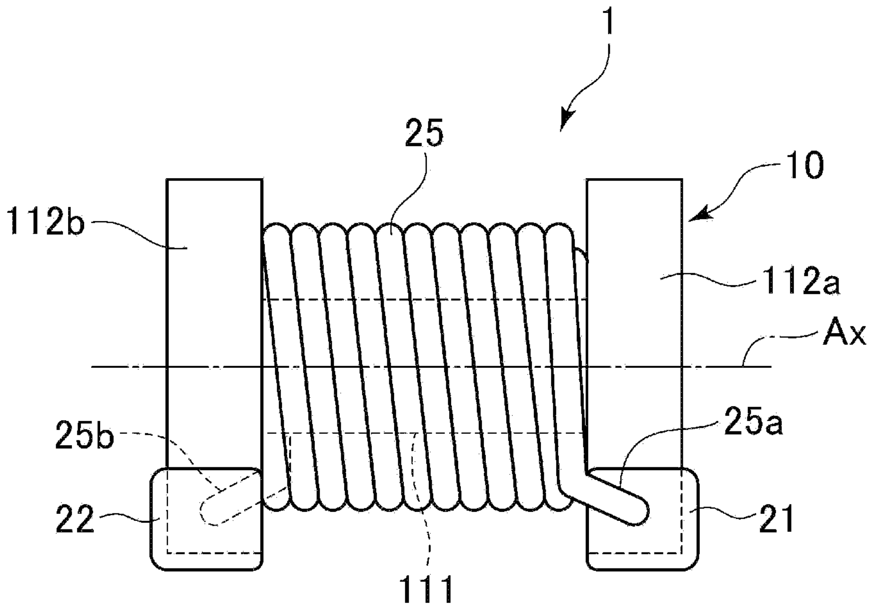
FIG. 9 is a front view schematically showing a coil component according to still another embodiment of the present invention.

The following describes a coil component 1 according to another embodiment of the present invention with reference to FIG. 9. The coil component 1 shown in FIG. 9 is a winding coil. The coil component 1 in the embodiment shown in FIG. 9 includes a magnetic base body 10 shaped like a drum, a coil conductor 25, a first external electrode 21 and a second external electrode 22. The magnetic base body 10 includes a winding core 111, a flange 112*a* having a rectangular parallelepiped shape and provided on one end of the winding core 111, and a flange 112*b* having a rectangular parallelepiped shape and provided on the other end of the winding core 111. The winding core 111 extends along the coil axis Ax. The coil conductor 25 is wound on the winding core 111. In other words, the coil conductor 25 extends spirally around the coil axis Ax. The coil conductor 25 includes a conductive wire made of a highly conductive metal material and an insulating layer covering and surrounding the conductive wire. The first external electrode 21 extends along the bottom surface of the flange 112*a*, and the second external electrode 22 extends along the bottom surface of the flange 112*b*.

As described above, the magnetic base body 10 includes plural metal magnetic particles, the surface of each of the metal magnetic particles included in the magnetic base body 10 is formed with an insulating oxide layer 41 consisting of oxide of the element A, and plural metal Fe particles 42 are disposed between adjacent ones of the metal magnetic particles. In a case where the metal magnetic particle contains Cr or where a coating layer containing Cr is present on the surface of the metal magnetic particle, plural metal Cr particles 43 are disposed between adjacent ones of the metal magnetic particles, Next, a description is given of an example method of manufacturing the winding coil component 1 shown in FIG. 9. First, plural metal magnetic particles are mixed and kneaded with a resin and a diluting solvent to make a resin composition mixture, and then, the resin composition mixture is molded by compression, thereby making a molded body. Following this, the molded body is subjected to a first heat treatment in accordance with the conditions as described in relation to step S12, and then, the molded body finished with the first heat treatment is subjected to a second heat treatment in accordance with the conditions as described in relation to step S12. The second heat treatment produces a magnetic base body 10 from the molded body.

Next, a coil mounting step is performed where a coil conductor 25 is mounted in the magnetic base body 10 resulting from the above-described heat treatment. In the coil mounting step, the coil conductor 25 is wound around the winding core 111 of the magnetic base body 10, one end of the coil conductor 25 is connected to the first external electrode 21, and the other end is connected to the second external electrode 22. The winding coil component 1 is obtained in the above-described manner.

EXAMPLES

Examples of the present invention will now be described. The samples to be evaluated were fabricated in the following manner. First, metal magnetic particles having composition of Fe—Si—Cr (Si: 3.5 wt %, Cr:1.5 wt %, and the remaining including Fe and inevitable impurities) with the average particle size of 4 μm were prepared. Then, the metal magnetic particles were mixed with a PVB resin and an organic solvent to make a resin composition mixture. Following this, the resin composition mixture was placed in a cavity of a mold and a molding pressure was applied to the resin composition mixture. As a result, a plate-shaped molding body having a thickness of 1 mm was fabricated. The molded body was then punched into a molded body shaped like a toroidal core having an outer diameter of 10 mm φ and an inner diameter of 5 mm φ. The molded body shaped like a toroidal core was then subjected to the heat treatment 1 and the heat treatment 2 in this order for 60 minutes respectively. The samples 1 to 12 were thus obtained.

TABLE 1

| Sample | Heat treatment 1 | | Heat treatment 2 | |
|---|---|---|---|---|
| number | Temperature | Atmosphere | Temperature | Atmosphere |
| 1 (Comparative example) | 300° C. | Air | 800° C. | 800 ppm$O_2$ |
| 2 (Comparative example) | 300° C. | Air | 800° C. | $N_2$ |
| 3 (Example) | 300° C. | Air | 400° C. | 0.5% $H_2$ |
| 4 (Example) | 300° C. | Air | 600° C. | 0.5% $H_2$ |
| 5 (Example) | 300° C. | Air | 700° C. | 0.5% $H_2$ |
| 6 (Example) | 300° C. | Air | 800° C. | 0.5% $H_2$ |
| 7 (Example) | 300° C. | Air | 400° C. | 4% $H_2$ |
| 8 (Example) | 300° C. | Air | 600° C. | 4% $H_2$ |
| 9 (Example) | 300° C. | Air | 700° C. | 4% $H_2$ |
| 10 (Example) | 300° C. | Air | 800° C. | 4% $H_2$ |
| 11 (Example) | 400° C. | Air | 600° C. | 4% $H_2$ |
| 12 (Example) | 400° C. | 800 ppm$O_2$ | 600° C. | 4% $H_2$ |

Next, metal magnetic particles having composition of Fe—Si (Si: 3.5 wt %, and the remaining including Fe and inevitable impurities) with the average particle size of 4 μm were prepared. Then, the metal magnetic particles were mixed with a PVB resin and an organic solvent to make a resin composition mixture. Following this, the resin composition mixture was placed in in a cavity of a mold and a molding pressure was applied to the resin composition mixture. As a result, a plate-shaped molding body having a thickness of 1 mm was fabricated. The molded body was then punched into a molded body shaped like a toroidal core having an outer diameter of 10 mm φ and an inner diameter of 5 mm φ. The molded body shaped like a toroidal core was then subjected to the heat treatment 1 and the heat treatment 2 in this order for 60 minutes respectively. The samples 13 to 24 were thus obtained.

TABLE 2

| Sample | Heat treatment 1 | | Heat treatment 2 | |
|---|---|---|---|---|
| number | Temperature | Atmosphere | Temperature | Atmosphere |
| 13 (Comparative example) | 300° C. | Air | 800° C. | 800 ppm$O_2$ |
| 14 (Comparative example) | 300° C. | Air | 800° C. | $N_2$ |
| 15 (Example) | 300° C. | Air | 400° C. | 0.5% $H_2$ |
| 16 (Example) | 300° C. | Air | 600° C. | 0.5% $H_2$ |
| 17 (Example) | 300° C. | Air | 700° C. | 0.5% $H_2$ |
| 18 (Example) | 300° C. | Air | 800° C. | 0.5% $H_2$ |
| 19 (Example) | 300° C. | Air | 400° C. | 4% $H_2$ |
| 20 (Example) | 300° C. | Air | 600° C. | 4% $H_2$ |
| 21 (Example) | 300° C. | Air | 700° C. | 4% $H_2$ |
| 22 (Example) | 300° C. | Air | 800° C. | 4% $H_2$ |
| 23 (Example) | 400° C. | Air | 600° C. | 4% $H_2$ |
| 24 (Example) | 400° C. | 800 ppm$O_2$ | 600° C. | 4% $H_2$ |

For each test piece of the toroidal-core shaped samples 1 to 24 obtained in the above-described manner, a commercially available impedance analyzer was used to measure their magnetic permeability at 10 MHZ to measure their volume resistance according to JIS-K6911. Additionally, for each of the samples 1 to 24, electrodes were attached to its opposing surfaces, and incremental voltages were applied to the electrodes to measure a voltage at the time of occurrence of a short circuit. The value obtained by dividing the voltage at the time of occurrence of a short circuit by a distance between the electrodes expressed in micrometers was defined as a dielectric strength voltage for each sample. Table 3 and Table 4 show these measurement calculation results.

TABLE 3

| Sample number | Magnetic permeability | Resistance value [Ω · $cm^{-1}$] | Dielectric strength voltage [v/μm] |
|---|---|---|---|
| 1 (Comparative example) | 36 | $1.2 \times 10^6$ | 0.55 |
| 2 (Comparative example) | 40.2 | $<1 \times 10^4$ | <0.1 |
| 3 (Example) | 44.7 | $0.9 \times 10^7$ | 0.78 |
| 4 (Example) | 44.7 | $1.0 \times 10^7$ | 0.80 |
| 5 (Example) | 44.5 | $1.6 \times 10^7$ | 0.90 |
| 6 (Example) | 46 | $1.7 \times 10^7$ | 0.93 |
| 7 (Example) | 53 | $1.0 \times 10^8$ | 1.07 |
| 8 (Example) | 53.4 | $1.1 \times 10^8$ | 1.08 |
| 9 (Example) | 53.9 | $1.9 \times 10^8$ | 1.33 |
| 10 (Example) | 52.5 | $2.2 \times 10^8$ | 1.38 |
| 11 (Example) | 50.2 | $2.5 \times 10^8$ | 1.47 |
| 12 (Example) | 52.3 | $2.4 \times 10^8$ | 1.44 |

TABLE 4

| Sample number | Magnetic permeability | Resistance value [$\Omega \cdot cm^{-1}$] | Dielectric strength voltage [v/μm] |
|---|---|---|---|
| 13 (Comparative example) | 33.8 | $3.0 \times 10^6$ | 0.75 |
| 14 (Comparative example) | 37.4 | $<1 \times 10^4$ | <0.1 |
| 15 (Example) | 42.1 | $2.0 \times 10^7$ | 0.99 |
| 16 (Example) | 42.2 | $2.2 \times 10^7$ | 1.03 |
| 17 (Example) | 42.5 | $2.4 \times 10^7$ | 1.10 |
| 18 (Example) | 42.6 | $2.6 \times 10^7$ | 1.25 |
| 19 (Example) | 49.4 | $3.5 \times 10^8$ | 1.31 |
| 20 (Example) | 49.7 | $3.6 \times 10^8$ | 1.38 |
| 21 (Example) | 49.4 | $3.9 \times 10^8$ | 1.45 |
| 22 (Example) | 48.2 | $4.2 \times 10^8$ | 1.48 |
| 23 (Example) | 47.3 | $4.4 \times 10^8$ | 1.44 |
| 24 (Example) | 48.2 | $4.3 \times 10^8$ | 1.42 |

The samples 1 to 24 were each subjected to the heat treatment 1 in the air or under an oxygen atmosphere with an oxygen concentration of 800 ppm at a temperature from 300 to 400 degrees Celsius in the manufacturing process. Accordingly, the resin in the resin composition mixture was removed by the heat treatment 1.

The measurement results in Table 3 show that the magnetic permeability, the resistance values, and the dielectric strength voltages of the samples 3 to 12 are higher than those of the samples 1 and 2 which are fabricated from metal magnetic particles having the same composition as the samples 3 to 12. It can be considered that these differences in the magnetic permeability, the resistance values and the dielectric strength voltages are caused by the difference of conditions of the heat treatment 2. The samples 1 and 2 were subjected to the heat treatment 2 under an oxygen atmosphere with an oxygen concentration of 800 ppm or under an inert atmosphere (under an $N_2$ atmosphere) in the manufacturing process, whereas the samples 3 to 12 were subjected to the heat treatment 2 under a reducing atmosphere in the manufacturing process. More specifically, the samples 3 to 6 were subjected to the heat treatment 2 under a reducing atmosphere with a hydrogen concentration of 0.5% in the manufacturing process, and the molded bodies of the samples 7 to 12 were subjected to the heat treatment 2 under a reducing atmosphere with a hydrogen concentration of 4.0% in the manufacturing process. The higher magnetic permeability, resistance values and dielectric strength voltages of the samples 3 to 12 as compared to the samples 1 and 2 can be considered to result from the following. The samples 3 to 12 were subjected to the heat treatment 2 under an reducing atmosphere, which caused an oxide film consisting of oxidized iron produced in the heat treatment 1 to be reduced and decomposed into metal Fe particles separated from each other, whereas the oxide film consisting of oxidized iron was not reduced in the samples 1 and 2. When the samples 3 to 6 subjected to the heat treatment 2 under a reducing atmosphere with a hydrogen concentration of 0.5% are compared with the samples 7 to 12 subjected to the heat treatment 2 under a reducing atmosphere with a hydrogen concentration of 4.0%, the measurement results show that the samples 7 to 12 subjected to the heat treatment 2 under a reducing atmosphere with a hydrogen concentration of 4.0%, which has a greater reducing power, have higher magnetic permeability, resistance values and dielectric strength voltages than the samples 3 to 6 subjected to the heat treatment 2 under a reducing atmosphere with a hydrogen concentration of 0.5%.

The measurement results in Table 4 show that the samples 13 to 24 using metal magnetic particles including Al have a tendency similar to the samples 1 to 12 using metal magnetic particles including Cr. More specifically, the magnetic permeability, the resistance values and the dielectric strength voltages of the samples 15 to 24 were higher than those of the samples 13 and 14. The samples 13 and 14 were subjected to the heat treatment 2 under an oxygen atmosphere with an oxygen concentration of 800 ppm or under an inert atmosphere (under an $N_2$ atmosphere) in the manufacturing process, whereas the samples 15 to 18 were subjected to the heat treatment 2 under a reducing atmosphere with a hydrogen concentration of 0.5% in the manufacturing process, and the molded bodies of the samples 19 to 24 were subjected to the heat treatment 2 under a reducing atmosphere with a hydrogen concentration of 4.0% in the manufacturing process. The higher magnetic permeability, resistance values and dielectric strength voltages of the samples 15 to 24 as compared to the samples 13 and 14 can be considered to result from the following. In the samples 15 to 24, an oxide film consisting of oxidized iron produced in the heat treatment 1 was reduced and decomposed into metal Fe particles separated from each other, whereas the oxide film consisting of oxidized iron was not reduced in the samples 13 and 14. When the samples 15 to 18 subjected to the heat treatment 2 under a reducing atmosphere with a hydrogen concentration of 0.5% are compared with the samples 19 to 24 subjected to the heat treatment 2 under a reducing atmosphere with a hydrogen concentration of 4.0%, the measurement results show that the samples 19 to 24 subjected to the heat treatment 2 under a reducing atmosphere with a hydrogen concentration of 4.0%, which has a greater reducing power, have higher magnetic permeability, resistance values and dielectric strength voltages than the samples 15 to 18 subjected to the heat treatment 2 under a reducing atmosphere with a hydrogen concentration of 0.5%.

The samples 1 to 24 were each cut to expose their cross-section surfaces. A transmission electron microscope (TEM) equipped with an energy dispersive X-ray spectroscopy (EDS) detector is used to obtain a TEM image by photographing an area of 250 nm square in each of the exposed cross-section surfaces. An EDS analysis was performed for the TEM image and an area between adjacent ones of metal magnetic particles was observed. Two belt-like layers including Si and O were identified between the adjacent ones of the metal magnetic particles in the samples 1, 2, 13 and 14. A layer including Fe, Cr and O was identified between the two layers including Si and O in the samples 1 and 2. A layer including Fe and O was identified between the two layers including Si and O in the samples 13 and 14. In contrast, in the samples 3 to 12 and 15 to 24, two belt-like layers including Si and O were identified between adjacent ones of the metal magnetic particles and plural nanometer-size particles having a particle size from 2 nm to 30 nm were identified between the two belt-like layers including Si and O. An SEM-EBSD analysis was performed on crystalline phases of the nanometer-size particles using the "Ultra-High-Resolution Schottky Scanning Electron Microscope SU7000" from Hitachi High-Tech and a velocity detector from AMETEC. As a result of the analysis, it was confirmed that the nanometer-size particles adhered to the belt-like layers including Si and O on the surface of the metal magnetic particles in the observed area in the samples 3 to 12 were metal Fe of a single α phase. It was also confirmed that the nanometer-size particles adhered to the belt-like layers including Si and O on the surface of the metal magnetic particles in the observed area in the samples 15 to 24 were metal Fe of a single α phase.

Advantageous effects of the above-described embodiments will now be described. According to one or more embodiments of the present invention, plural metal Fe particles 42 are present between the first oxide layer 41A and the second oxide layer 41B. The metal Fe particles 42 consist of metal Fe of a single α phase exhibiting a soft magnetic property. Accordingly, the magnetic base body 10 according to an embodiment of the present invention has a higher magnetic permeability than a known magnetic base body including Fe elements as oxide between the first oxide layer 41A and the second oxide layer 41B. Further, according to an embodiment of the present invention, the metal Fe particles 42 are disposed dispersedly between the first oxide layer 41A and the second oxide layer 41B, and there are no layer consisting of oxidized iron. Accordingly, the magnetic base body 10 according to an embodiment of the present invention has higher resistance values and dielectric strength voltages than a known magnetic base body having a layer of oxidized iron between adjacent ones of the metal magnetic particles.

There are also metal Cr particles 43 disposed in the area between the first oxide layer 41A and the second oxide layer 41B in a dispersed manner, which is neither in a layered nor membranous manner. Accordingly, the magnetic base body 10 according to an embodiment of the present invention has a higher magnetic permeability than a known magnetic base body including Cr elements as oxide between the first oxide layer 41A and the second oxide layer 41B. Furthermore, since the magnetic base body 10 includes metal Cr particles 43 disposed in a dispersed manner, the insulation property of the magnetic base body 10 is not deteriorated by the metal Cr particles 43.

The dimensions, materials, and arrangements of the constituent elements described for the above various embodiments are not limited to those explicitly described for the embodiments, and these constituent elements can be modified to have any dimensions, materials, and arrangements within the scope of the present invention. For example, the magnetic base body 10 may be configured and arranged to either contain the coil conductor 25, as shown in FIGS. 1 and 2, or have the coil conductor 25 wound thereon, as shown in FIG. 9.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. A magnetic base body comprising:

plural metal magnetic particles including first metal magnetic particles and second metal magnetic particles adjacent to the first metal magnetic particles, each of the plural metal magnetic particles including Fe; and three or more metal Fe particles, including metal Fe of a single phase, disposed at a distance from each other between a first oxide layer and a second oxide layer provided on one of the first metal magnetic particles and one of the second metal magnetic particles, respectively, the first oxide layer having an insulation property and including oxide of an element A disposed on a surface of the first metal magnetic particles, the second oxide layer having an insulation property and including oxide of an element B disposed on a surface of the second metal magnetic particles, the element A being at least one element selected from a group consisting of Si, Zr, Al, and Ti, and the element B being at least one element selected from the group consisting of Si, Zr, Al, and Ti.

2. The magnetic base body according to claim 1, wherein the three or more metal Fe particles have an average particle size from 2 to 30 μm.

3. The magnetic base body according to claim 1, wherein each of the three or more metal Fe particles is in direct contact with at least one of the first oxide layer and the second oxide layer.

4. The magnetic base body according to claim 1, wherein each of the three or more metal Fe particles is isolated from an adjacent one of the three or more metal Fe particles by an insulating intervening portion.

5. The magnetic base body according to claim 1, wherein each of the plural metal magnetic particles further includes Cr, and the magnetic base body further includes plural metal Cr particles including metal Cr, the plural metal Cr particles disposed between the first oxide layer and the second oxide layer and separated from each other.

6. The magnetic base body according to claim 5, wherein each of the plural metal Cr particles is disposed at a distance from each of the three or more metal Fe particles.

7. A coil component comprising:

the magnetic base body according to claim 1; and a coil conductor provided in or on the magnetic base body.

8. A circuit board comprising the coil component according to claim 7.

9. An electronic device comprising the circuit board according to claim 8.

10. A manufacturing method of the magnetic base body according to claim 1, the method comprising:

a step of preparing a molded body including the plural metal magnetic particles, the plural metal magnetic particles including Fe;

a first heating step of heating the molded body to form the first oxide layer comprising a first oxide film on a surface of each of the plural metal magnetic particles and the second oxide layer comprising a second oxide film on a surface of the first oxide film, the first oxide film including oxide of the element A, and the second oxide film including oxide of the element B; and a second heating step of, after the first heating step, heating the molded body under a reducing atmosphere to produce plural metal Fe particles from the second oxide film.

11. The manufacturing method according to claim 10, wherein the plural metal Fe particles are produced to be at a distance from each other in the second heating step.

12. The manufacturing method according to claim 10, wherein each of the plural metal magnetic particles further includes Cr, the first heating step includes forming a third oxide film including Cr oxide on the surface of the first oxide film, the second oxide film being formed on the third oxide film, and the second heating step includes producing plural metal Cr particles consisting of metal Cr from the third oxide film.

13. The manufacturing method according to claim 10, wherein the first heating step is performed under an oxygen atmosphere with an oxygen concentration of 800 ppm or greater at a first temperature from 300 to 400 degrees Celsius.

14. The manufacturing method according to claim 10, wherein the second heating step is performed at a second temperature from 400 to 800 degrees Celsius.

15. The manufacturing method according to claim 10, wherein the reducing atmosphere under which the second heating step is performed has a hydrogen concentration from 0.5% to 4.0%.

16. The magnetic base body according to claim 1, wherein the three or more metal Fe particles include a first Fe particle, a second Fe particle, and a third Fe particle, and each of the first Fe particle, the second Fe particle, and the third Fe particle is in direct contact with the first oxide layer and the second oxide layer.

17. The magnetic base body according to claim 1, wherein the three or more metal Fe particles include a first Fe particle, a second Fe particle, and a third Fe particle, each of the first Fe particle and the second Fe particle is in direct contact with the first oxide layer and the second oxide layer, and the third Fe particle is in direct contact with the first oxide layer and apart from the second oxide layer.

18. The magnetic base body according to claim 1, wherein three or more metal Fe particles include a first Fe particle, a second Fe particle, a third Fe particle, and a fourth Fe particle and each of the first Fe particle, the second Fe particle, the third Fe particle and the fourth Fe particle is in direct contact with the first oxide layer and the second oxide layer.

19. The magnetic base body according to claim 1, wherein an occupancy of a phase of each of the three or more metal Fe particles is 95% or greater.

20. The magnetic base body according to claim 1, wherein the three or more metal Fe particles are formed through a heating process comprising heating Fe elements included in the plural metal magnetic particles to produce an oxidized iron film and heating under a reducing atmosphere for reducing and decomposing the oxidized iron film into the three or more metal Fe particles that are disposed at the distance from each other, without maintaining a layer structure of the oxidized iron film.

21. The magnetic base body according to claim 20, wherein the heating process includes formation of a first oxide film on a surface of each of the plural metal magnetic particles and a second oxide film on a surface of the first oxide film, the first oxide film including oxide of the element A, and the second oxide film including Fe oxide; and wherein the heating under the reducing atmosphere produces the three or more metal Fe particles from the second oxide film.

22. The magnetic base body according to claim 1, wherein an image of a cross-section of the magnetic base body shows a first belt-like area including the element A at a location corresponding to the first oxide layer disposed on a surface of one of the first metal magnetic particles and a second belt-like area including the element B at a location corresponding to the second oxide layer disposed on a surface of one of the second metal magnetic particles, and an area of 2 nm to 30 nm where the three or more metal Fe particles agglutinate between the first and second belt-like areas.

* * * * *